May 18, 1937.  L. A. FRAYER  2,080,850
MANUFACTURE OF NUTS
Filed Sept. 5, 1936  2 Sheets-Sheet 1

INVENTOR.
LEE A. FRAYER
BY  Kwis, Hudson & Kent.
ATTORNEYS

May 18, 1937.  L. A. FRAYER  2,080,850
MANUFACTURE OF NUTS
Filed Sept. 5, 1936  2 Sheets-Sheet 2

INVENTOR.
LEE A. FRAYER
BY Kwis. Hudson & Kent
ATTORNEYS

Patented May 18, 1937

2,080,850

UNITED STATES PATENT OFFICE 2,080,850

MANUFACTURE OF NUTS

Lee A. Frayer, Kent, Ohio, assignor to The Lamson & Sessions Company, Cleveland, Ohio, a corporation of Ohio Application September 5, 1936, Serial No. 99,614

9 Claims. (Cl. 10—86)

This invention relates to the manufacture of nuts or like metallic articles and, as its principal object, aims to provide a novel method of making nuts in which a minimum amount of material is wasted as scrap, and in which a rapid rate of production can be maintained with minimum wear and breakage on the dies.

Another object of my invention is to provide a novel method of producing nuts or like articles by cold working, wherein a centering recess is formed in one end of a blank and in a succeeding operation the blank is expanded and shaped in a polygonal die cavity by a partial piercing thereof by a punch engaging in such centering recess.

Still another object of my invention is to provide a novel method of producing nuts wherein a centering recess is formed in one end of a blank during an initial operation thereon and then partially piercing the blank during a second operation by a punch engaging in said centering recess and, in the same operation, forming a centering recess in the other end of the blank to be engaged by a punch during a third operation on the blank.

A further object of my invention is to provide a novel method of making nuts or the like, comprising punching an axial opening through a blank and thereby expanding and shaping the same in a polygonal die cavity and utilizing axial pressure exerted on the blank by the punch in forming a crown or chamfer on one end of the blank.

Yet another object of my invention is to provide a novel method of making nuts or the like in which a blank of substantially circular cross-section is pierced and expanded and thereby formed to polygonal shape by forcing into the blank a tapered sharply pointed punch while metal of the blank is free to flow in at least one direction.

Other objects and advantages of my invention will be apparent from the following description when taken in conjunction with the accompanying drawings in which Figs. 1 to 5 inclusive are sectional views taken respectively through pairs or sets of dies which may be used in carrying out the steps of my novel method.

More detailed reference will presently be made to the drawings for the purpose of describing my novel method of manufacturing nuts and like articles, but before proceeding with such detailed description it might be mentioned that the present invention is an improvement over the patent issued to myself and Carl L. Harvey, No. 2,015,596, September 24, 1935, and over copending application Serial No. 699,117, filed November 22, 1933.

In carrying out the present method it will be understood that blanks to be operated upon are provided as by cutting successive sections from the end of a bar or rod of suitable metal stock, preferably of round cross section because this is readily obtainable at minimum cost. The sections cut from such stock are of a length to provide an amount of metal slightly in excess of the metal contained in the finished blank. It is generally found that in successively cutting such relatively short sections from the end of a bar of stock the blanks are usually distorted to some extent during the cutting operation. For best results in using my novel method, I find it desirable to straighten or square up each of these blanks and this is accomplished in the first operation performed thereon in which I also form a centering recess in one end of each blank for an important purpose to be described hereinafter.

Figure 1:
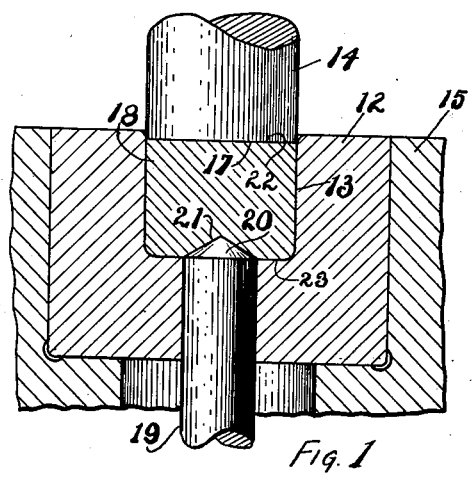

In Fig. 1 I show a set or pair of dies suitable for carrying out the first operation of my novel method and which may be one of a row or series of die sets. This first set may consist of a die 12 having a substantially cylindrical cavity or recess 13 therein and a substantially cylindrical punch 14 aligned with such cavity and adapted to enter the open end thereof. The die 12, as well as the corresponding die members of the other sets, may be suitably supported as by being snugly received in a recess of a die block 15, which may be mounted upon the frame of a header or other fabricating machine. As is well understood by persons skilled in this art, the punch 14 and the corresponding punches of the other sets may be carried by a suitable punch holder which is in turn connected with the reciprocating member or slide of the machine.

As shown in the drawings, the outer end of the punch 14 is provided with a substantially flat face 17 for engaging one end of the blank 18, which is received in the die cavity 13. This cavity is formed as a pocket in the die 12, to which the blanks 18 may be conveyed or fed in succession between strokes of the punch 14, by a transfer device or a suitable feeding mechanism. The bottom of the die cavity 13 is formed in part by the end of a knock-out pin 19 which operates to eject the blanks from the die.

According to my invention, the end of the knock-out pin 19 is formed with a relatively sharp cone-like projection 20 which extends into the die cavity 13, and during the squaring or straightening operation performed by the die and punch, this projection is forced into the inner end of the blank to form a centering recess 21 therein. In the operation performed by the dies 12 and 14 the blank 18 is subjected to axial pressure in the cavity 13, which in addition to causing the formation of the centering recess 21, causes the end faces 22 and 23 of the blank to be flattened and squared with respect to the axis of the blank. In addition to this the blanks are slightly upset or sized in the die cavity 13, so that all of the blanks delivered to the next succeeding station will be of the same outside diameter.

Figure 6:
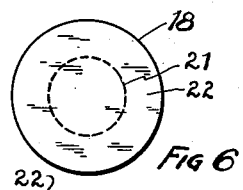
Fig. 6 is an end view of the blank resulting from the first operation of my method.
Figure 7:
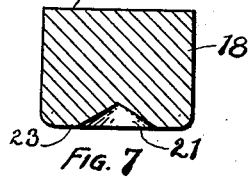
Fig. 7 is a longitudinal sectional view through the blank.

The blanks delivered from the first operation are of the form illustrated in Figs. 6 and 7, in which it will be noted that the blank has the centering recess 21 in one end thereof. As these blanks are delivered from the die cavity 13 they are transferred to a succeeding station as by means of a suitable transfer or feeding mechanism, and during such transfer the blank is inverted so that the centering recess 21 may cooperate with a piercing punch used in the next operation.

Figure 2:
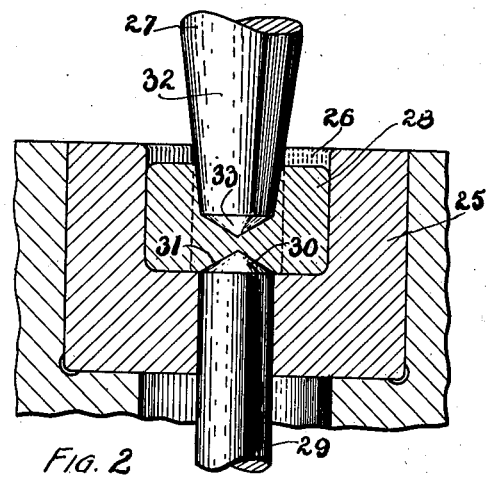

The second operation is a forming operation in which the blank is expanded or upset by a partial piercing thereof, as illustrated in Fig. 2. The second operation may be carried out by the use of a die 25, similar to the die 12 but having a cavity 26 of polygonal cross-section, in this instance hexagonal. A punch 27 of circular cross-section is carried by the holder and is aligned with the die cavity 26 to operate on the blank 28 received therein. This die cavity is also in the form of a pocket or recess, the end wall of which is formed in part by the outer end of a knock-out pin 29. The cavity is preferably of a size such that the distance across a pair of opposed flats of the hexagon is a few thousandths of an inch larger than the diameter of the blank 18, so that the blanks resulting from the first operation will readily pass into the cavity for the second operation and will be substantially centered with respect to the die axis by contact with the flats of the cavity. The outer end of the knock-out pin 29 has a relatively sharp cone-like projection 30 which extends into die cavity 26 and forms a centering recess 31 in the inner end of the blank 28 for use in the next operation thereon.

In the second operation the blank 28 is partially pierced and thereby expanded or upset in the polygonal die cavity 26. For carrying out this piercing and expanding of the blank I provide the punch 27 with a tapered portion 32 having a relatively sharp cone-like tip 33. When the punch 27 is forced into the blank the material thereof is displaced laterally to thereby expand or upset the blank in the polygonal die cavity 26.

Figure 8:
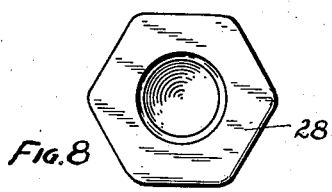
Fig. 8 is an end view of the blank resulting from the second operation.
Figure 9:
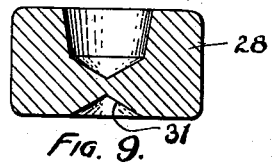
Fig. 9 is a longitudinal sectional view thereof.
Figure 10:
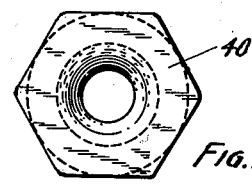
Fig. 10 is an end view of the blank produced during the third operation.
Figure 11:
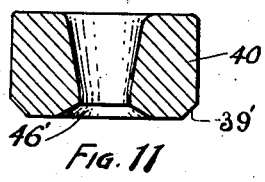
Fig. 11 is a longitudinal sectional view of such blank.

It will be noted, however, that because the die cavity is open at its outer end during this operation the metal of the blank is not trapped but is free to flow in the direction of the axis of the punch, thereby preventing excessive pressures being set up in the tools. The expanding or upsetting of the blank in the die cavity 26 causes the blank to be roughly shaped to the polygonal cross-section of the die cavity. In this instance the die cavity 26 being of hexagonal shape, the blank 28 assumes the shape of a rough hexagon as shown in Figs. 8 and 9, in which the corners are not sharply filled out.

Figure 3:
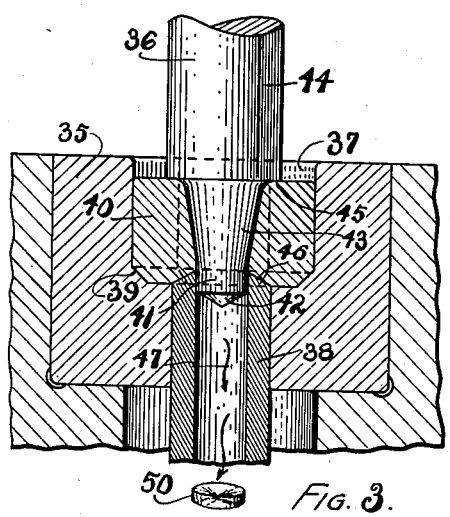

The blanks 28, as delivered from the second operation, are transferred to a succeeding station at which they are subjected to a further forming operation by a die 35 and a punch 36 cooperating therewith, as illustrated in Fig. 3. The die 35 has a recess or cavity 37, which is of hexagonal cross-section and of a size to freely receive the blanks. In delivering the blanks to this die cavity 37 they are inverted so that the centering recess 31 will be toward the outer end of the die cavity and will be engaged by the punch 36.

The die cavity 37 is also in the form of a recess or pocket which is open at its outer end and at its inner end is closed in part by a hollow knock-out pin 38. The inner end of the die cavity is also provided with a beveled portion 39 which forms a chamfer 39' on the inner end of the blank 40. The punch 36 is preferably constructed with a cylindrical portion or section 41 adjacent the end thereof and which has a relatively sharply pointed cone-like tip 42. The cylindrical portion 41 is carried by, and merges with, the small end of a tapering portion 43 which is in turn carried by the cylindrical stem 44. This stem is of larger diameter than the large end of the tapering section 43 so that an annular shoulder 45 is provided to act on the outer end of the blank 40. As shown in the drawings the outer end of the knock-out pin 38 is preferably provided with a beveled portion 46 which projects into the die cavity 37. The knock-out pin 38 is provided with an opening 47 therethrough which, adjacent the die cavity 37, is of a size to receive the cylindrical end portion 41 of the punch 36.

In the forming operation carried out by the die 35 and the punch 36, the section 41 of the punch forms an axial opening through the blank by connecting the centering recess 31 with the recess formed by the piercing punch 27. This is done by a shearing or displacing of at least a portion of the intervening web of metal in the form of a slug 50 which falls away from the die 35 through the opening 47 of the knock-out pin. During or immediately following the displacing of the slug 50 the tapered portion 43 of the punch 36 is forced into the axial opening to thereby expand the blank and further shape the same in the polygonal die cavity 37. As the punch completes its inward stroke the shoulder 45 engages the outer end of the blank and exerts axial pressure thereon. The axial pressure exerted on the blank either by the punching and expanding of the axial opening or by the shoulder 45 or both, causes the beveled portion at the inner end of the die cavity to form the chamfer 39' on the blank. This axial pressure also causes the beveled projection 46 of the knock-out pin to form a corresponding bevel or chamfer 46' at the end of the axial opening of the blank.

The blanks as delivered from the third forming operation are of the shape illustrated in Figs.

10 and 11, from which it will be seen that at this stage the blank has a tapered axial opening provided with the bevel 46' at one end thereof. At this stage of the method the chamfer 39' as produced during the second forming operation preferably has a steeper angle than is desirable in the finished blank, but it will be seen that the angle of this chamfer is flattened during the succeeding operation.

Figure 4:
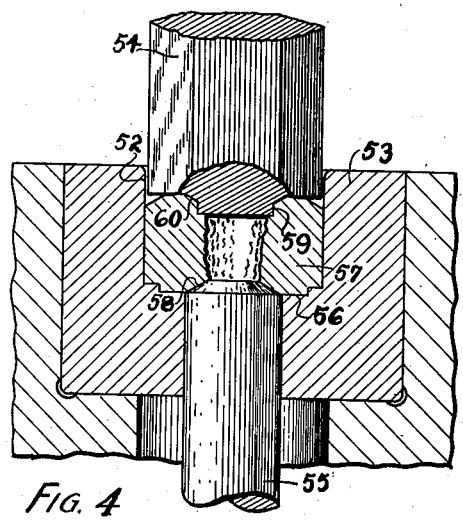

The blanks delivered from the third forming operation are transferred to a succeeding station in which the shaping of the exterior of the blank is completed. This further shaping operation may be carried out, as illustrated in Fig. 4, in the hexagonal cavity or recess 52 of the die 53 under the action of a hexagonal punch 54, which substantially closes the outer end of the die cavity. The inner end of the die cavity 52 is closed in part by a knock-out pin 55 and has a circular shouldered recess 56 which forms a corresponding washer face 56' on one end of the blank 57. The outer end of the knock-out pin 55 is provided with a beveled projection 58 which extends part way into the die cavity and acts on the blank to form a corresponding bevel 58' at one end of the axial opening of the blank. The punch 54 is provided at its end with a cylindrical projection 59 which extends part way into the axial opening of the blank when the punch engages the latter. Adjacent the extension 59 the punch is provided with a beveled annular shoulder 60 which acts on the outer end of the blank to form a corresponding bevel 60' at the outer end of the axial opening.

Figure 12:
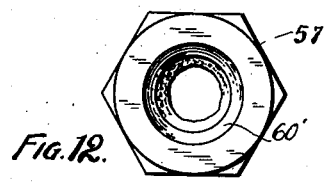
Fig. 12 is an end view of the blank resulting from the fourth operation.
Figure 13:
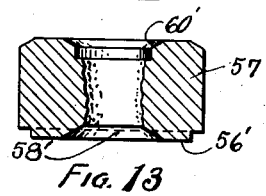
Fig. 13 is a longitudinal sectional view thereof.
Figure 14:
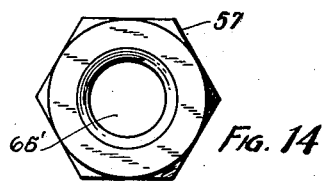
Figs. 14 and 15 are end and elevational views, respectively, showing the blank after the fifth operation and ready to be tapped.
Figure 15:

During this further shaping operation the blank 57 is subjected to axial pressure by the punch 54 and is thereby accurately shaped in the die cavity to the form illustrated in Figs. 12 and 13, in which it will be seen that the corners of the hexagon are sharply filled out. During this operation the punch 54 substantially closes the outer end of the die cavity 52 and the metal of the blank is substantially trapped in the die cavity so that any excess metal must flow into the axial opening of the blank. The flat portion of the end of the punch 54 surrounding the beveled shoulder 60 acts on the outer end of the blank and flattens the same, thereby changing the angle of the previously formed chamfer 39' to the desired relatively flatter angle of the finished blank illustrated in Fig. 15.

Figure 5:
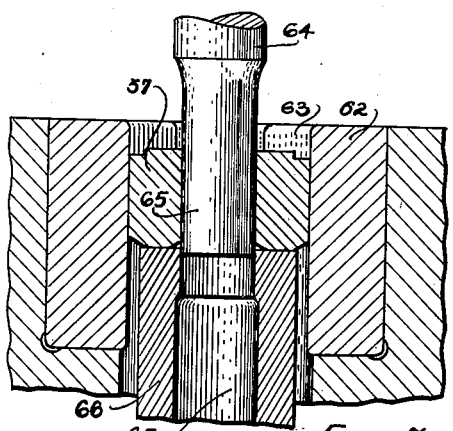

The blanks delivered from the die 53 are transferred to a succeeding station in which the axial opening of the blank is sized by punching out or trimming therefrom the excess metal. This operation may be carried out, as shown in Fig. 5, by use of a die 62 having a hexagonal opening 63 of a size to receive the blank 57, and a punch 64 having a cylindrical portion 65 of a size to produce a tap opening 65' of the desired size. Cooperating with the die 62 and the punch 64 is a hollow knock-out pin 66 which engages and supports the inner end of the blank and acts as an anvil or backing member for the punch. The trimmings displaced from the axial opening of the blank by the punch 65 fall away from the die through the passage 67 of the knock-out pin.

From the foregoing description and the accompanying drawings it will now be readily seen that I have provided a novel method of producing nuts or the like by cold working, in which a centering recess is formed in an end of the blank for cooperation with a punch in the next succeeding operation. It will also be seen that I have provided a novel method in which the partial piercing of the blank and the punching of the axial opening therethrough are carried out by the use of relatively sharply pointed punch or knock-out members. It will also be understood that a further advantage is realized in my novel method in that axial pressure exerted on the blank during the punching and expanding thereof is utilized in forming a chamfer or crown on the blank.

While I have illustrated and described my novel method in a somewhat detailed manner, it will be understood of course that I do not wish to be limited to the precise operations and steps of procedure disclosed, but regard my invention as including such modifications and arrangements as do not constitute a departure from the spirit of the invention and the scope of the appended claims.

Having thus described my invention, I claim:

1. In a method of making nuts, the steps of squaring the end faces of a blank by applying pressure thereto in a substantially cylindrical die cavity and in the same operation forming a centering recess in the inner end face of the blank, transferring the blank to a polygonal die cavity with the ends of the blank reversed, and then partially piercing the blank by a punch engaging in the centering recess and thereby expanding the blank in the polygonal die cavity.

2. In a method of making nuts by cold working, the steps of forming a centering recess in one end of a blank in one operation, and utilizing such recess for relatively centering the blank and a piercing punch during a succeeding operation in which the blank is partially pierced by the punch and thereby expanded in a polygonal die cavity, and forming a centering recess in the other end of the blank during said succeeding operation.

3. The method of making nuts comprising partially piercing a blank and thereby expanding the same in a polygonal die cavity, and then punching an axial opening through the blank and further expanding the same in a polygonal die cavity and utilizing thrust of the punching operation as the sole applied force for forming a chamfer on one end of the blank.

4. The method of making nuts comprising partially piercing a blank from opposite ends and thereby expanding the blank in a polygonal die cavity, punching an axial opening through the blank by connecting the recesses formed in the ends thereof, and further expanding the blank as a continuation of such punching operation and utilizing axial thrust of the punching operation as the sole applied force for forming a chamfer on one end of the blank.

5. The method of making nuts comprising partially piercing a blank and thereby expanding the same in a polygonal die cavity, and then punching an axial opening through the blank and further expanding the blank in a polygonal die cavity by forcing a tapered punch portion into the axial opening and utilizing axial thrust of such punching and expanding as the sole applied force for forming a chamfer on the blank.

6. A method of making nuts comprising expanding a blank in a polygonal die cavity by a partial axial piercing thereof and then punching an axial opening through the blank and further expanding the same in a polygonal die cavity, such piercing, punching and expanding of the blank being carried out with the metal of the bland unconfined and free to flow in at least one direction.

7. A method of making nuts comprising punching an axial opening through a blank and thereby expanding and shaping the blank in a polygonal die cavity while the metal of the blank is unconfined and free to flow in at least one direction and utilizing a shoulder on the punch to exert axial pressure on the blank as the sole applied force and forming a chamfer thereon.

8. The method of making nuts which comprises punching an axial opening entirely through a blank and thereby expanding and forming the blank to polygonal shape while metal of the blank is free to flow in at least one direction, further shaping the blank by applying pressure thereto in a substantially closed polygonal die and causing excess metal to flow into the axial opening, and then trimming out the axial opening.

9. A method of making nuts comprising punching an axial opening through a blank and thereby expanding and shaping the blank in a polygonal die cavity while the metal of the blank is unconfined and free to flow in at least one direction and utilizing axial pressure exerted by the punch for partially chamfering one end of the blank, and then exerting pressure on the blank in a closed polygonal die while excess metal is free to flow into the axial opening and in the same operation completing the chamfer on said one end of the blank and forming a washer face on the other end.

LEE A. FRAYER.